Patented Apr. 4, 1944

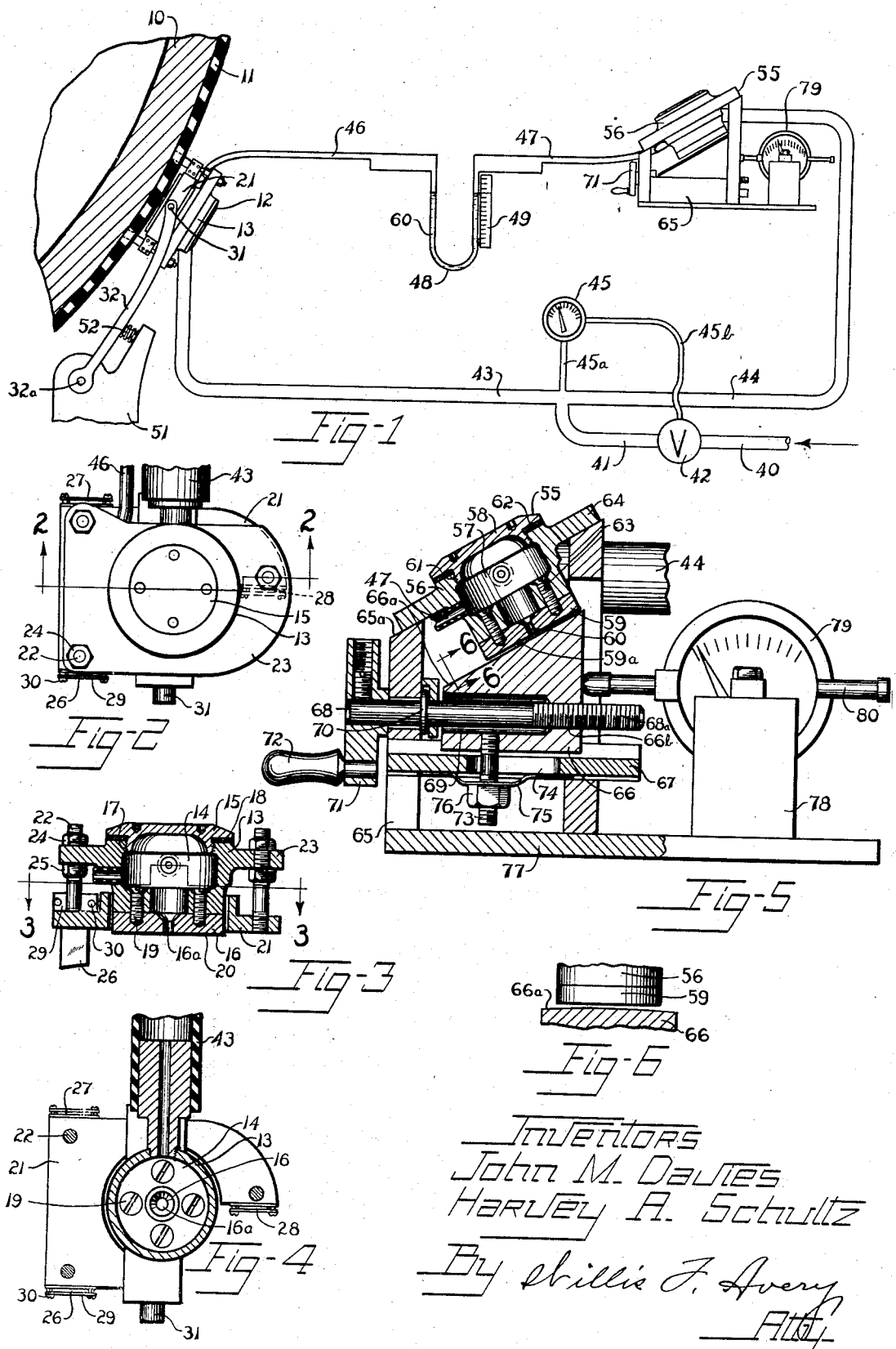

2,345,732

UNITED STATES PATENT OFFICE 2,345,732

MEASURING APPARATUS

John M. Davies, Akron, and Harvey A. Schultz, Cuyahoga Falls, Ohio, assignors to The B. F. Goodrich Company, New York, N. Y., a corporation of New York Application January 24, 1942, Serial No. 428,092

4 Claims. (Cl. 33—125)

This invention relates to measuring apparatus and is especially useful for measuring the thickness of sheet material passing over a rotatable surface such as a roller or drum.

In the manufacture of sheet material from plastics such as rubber, the measurement of the material as it is produced on a calender or other machine has been difficult as the rolls of the calender are never mathematically true cylinders and their shape changes with temperature and pressure, while the newly formed sheet material is soft and both the roll and the material are in motion. While it has been attempted to provide measuring instruments with rollers contacting with the material on the roll, such instruments, due to the speed of the roll and irregularities in the material, have failed to follow the surface of the plastic unless sufficient pressure was applied thereto to crush the plastic layer resulting in a false reading, and for the most part such instruments have not been sufficiently sensitive for the purpose.

While it has been proposed to measure the material by use of an orifice in a pneumatic pressure line held a fixed distance from the roll face so that the material passing the orifice changes the pressure in the line leading to the orifice, such a system has had the disadvantage of requiring perfect regulation of air supply to the line as the indicated measurement has varied with line pressure and it has been exceedingly difficult to regulate the line pressure properly.

The present invention aims to overcome the foregoing and other difficulties and to provide an accurate measurement of the material.

The principal objects of the invention are to provide accuracy of measurement, to provide for sensitivity to changes in thickness of the material, to provide a pneumatic gauging system in which the variations of line pressure are balanced out, to provide measurement of different thicknesses of material without adjustment of the roll-contacting mechanism, to provide for continuous and reliable measurement of a moving web of material, and to provide for measurement at high speeds.

These and other objects will appear from the following description and the accompanying drawing.

Of the drawing:

Fig. 1 is a diagrammatic view of the calender roll and the measuring apparatus, the roll being shown in section with the plastic material thereon, parts being broken away.

Fig. 2 is a view of the back of the floating gauge unit.

Fig. 3 is a cross-sectional view thereof taken on line 3—3 of Fig. 2.

Fig. 4 is a cross-sectional view thereof, taken on line 4—4 of Fig. 3.

Fig. 5 is a vertical cross-sectional view of the stationary gauge unit and its supporting structure taken on the plane of the feed screw axis.

Fig. 6 is a sectional view of the carriage taken on line 6—6 of Fig. 5.

In accordance with the invention a floating gauge unit is mounted so as to ride in contact with a moving roll and has an orifice adjustable toward and away from the material on the roll face, a second gauge unit is stationarily mounted in relation to an adjustable surface having micrometer adjustment, both gauge units are supplied by pressure fluid from a common source and the pressures in the lines to the two gauging units are balanced against each other so that only differences in the distance between the floating orifice and the work are measured by a manometer or other suitable instrument indicating pressures in a measuring line connecting the gauging units.

Referring to the drawing, the numeral 10 designates a calender or other roll upon which a sheet 11 of rubber composition or other material in sheet form is supported. A floating gauge member 12 is suitably supported in contact with the face of the roll.

The gauge unit 12 comprises a body 13 having a chamber 14 formed therein and closed at one side by a cover plate 15 and on the opposite side by an orifice plate 16 having an orifice 16a therethrough. The cover plate is threaded, as at 17 to engage complementary screw threads of the body 13 and a ring gasket 18 seals the joint therebetween. The orifice plate 16 is secured by screws 19 and its outer face 20 is accurately finished, as by grinding and lapping, preferably to a true plane. The orifice 16a is accurately ground and lapped to size. The body 13 is adjustably supported within a supporting member 21. For adjusting it a plurality of studs 22 are fixed to the supporting member and the body 13 has an apertured flange 23 through which the studs extend, threaded nuts 24, 25 being provided above and below the flange whereby the body 13 may be elevated or lowered with respect to the supporting member and locked in place.

For positioning the supporting member with respect to the roll surface, three knife blades 26, 27, 28 are adjustably clamped to the supporting member, as by straps 29 and screws 30. To compensate for possible errors in the indication of thickness due to change in the viscosity of the air due to changes of temperature at the calender roll and also for change in the distance of the orifice from the roll face due to such temperature changes, the studs 22 and the knife blades may be made of different materials. For example, with knives of steel, the studs 22 may be made of brass, aluminum, or other metal having a higher coefficient of expansion. While an increase of temperature of the roll face would then cause the studs to expand in length, moving the orifice slightly farther from the roll face, the same temperature change would increase the viscosity of the air at the orifice which in the absence of compensation would give a reading of thickness slightly too high. With the compensating studs, however, expansion of the studs due to the same temperature increase has been found to compensate for viscosity increase and to provide a reasonably accurate reading. The nuts 24, 25 may be adjusted for compensating for wear of the knives. Opposed pintles, such as 31 are provided on the supporting member 21 and a bifurcated lever 32 pivotally engages the pintles. The lever is pivotally supported as at 32a from the frame 51 of the calender or any stationary support and is weighted or spring pressed to press the unit against the face of the roll as by spring 52. The knives 26, 27, 28 are able to cut through the plastic material and contact the roll face at all times.

The gauge 55 is similar in construction to the gauge unit 12 and comprises a body 56 having a chamber 57 formed therein and closed at one side by a cover plate 58 and on the opposite side by an orifice plate 59 having an orifice 60 therethrough. The cover plate 58 is threaded, as at 61 to engage complementary screw threads of the body 56 and a ring gasket 62 seals the joint therebetween. The orifice plate 59 is secured to the body by screws 63 and its outer face 59a is accurately finished, as by grinding and lapping, preferably to a true plane. The orifice is accurately ground and lapped to size. Preferably the orifices 16a and 60 are of circular cross-section and of equal dimensions. The circular shape has been found most suitable for accurate production and maintenance of dimension.

The body is provided with a flange 64 whereby it is secured to the inclined upper face 65a of a rigid box-like frame 65 of metal open at its upper inclined face. A carriage 66 is mounted within the frame for sliding movement along a horizontal guideway 67 of the frame and below the gauge unit 55. The carriage has an inclined face 66a parallel to the inclined face which supports the gauge unit. This inclined face is of hardened steel and is ground and lapped. Preferably the inclined face of the carriage is curved laterally to the same curvature as the face of the roll 10 so that the relation of the gauge unit 55 to the inclined face duplicates the relation of the gauge unit 12 to the face of the roll.

For adjusting the carriage, a lead screw shaft 68 is rotatably journaled in the frame 65 and extends through a clearance opening 69 formed through the carriage 66. The shaft is restrained against end movement by a collar 70 formed integrally therewith and engaging a wall of the frame 65 and a crank disc 71 fixed to the shaft at the other side of the wall. A thread 68a formed on the shaft engages a complementary threaded opening 66b of the carriage. A crank handle 72 is fixed to disc 71. The arrangement is such that by rotating the crank disc 71 the carriage 66 is moved along its ways to change the distance between its inclined face and the gauge unit 55. A stud 73 fixed to the carriage 66 projects downwardly through a slot 74 in the ways. A leaf spring 75 having a central opening to receive the stud is pressed against the lower face of the ways by a nut 76 threaded on the stud and holds the carriage to the ways.

For measuring the adjustment of the carriage, the frame 65 is secured to a bed plate 77. A block 78 also fixed to the bed plate, supports a dial indicator 79 having a movable detector element 80 which impinges against the carriage. The indicator is graduated to indicate movements of the carriage.

For supplying fluid, such as dry air, under pressure to the gauge units, a supply line 40, from any convenient source of fluid pressure, supplies a line 41 through a reducing and pressure regulating valve 42. Line 41 is branched and supplies pressure through branches 43, 44 to the chambers of gauge units 12, 55 respectively. Branches 43, 44 are of large bore and short length so as to reduce friction and are connected to the gauge units by flexible tubing to permit movement of the units. A gauge 45 indicates the pressure at the union of the branch lines with line 41 through a connection 45a, and may be used to control valve 42 to control pressure approximately in the branch lines through a connection 45b.

Tubes 46, 47, preferably flexible, connect the chambers of gauge units 12 and 55 respectively with opposite limbs of a manometer tube 48. A scale 49 indicates the level of a fluid 50 in the manometer tube. The arrangement is such that the fluid level indicates any variation in pressure between the chambers of the gauge units and as any pressure variations in these units caused by variations in pressure in line 41 are balanced, all indicating pressure variations are due to difference in closing of the orifices of the respective gauge units. As flow in tubes 46, 47 is relatively low, these tubes may be relatively small but they are preferably so constructed that frictional resistance to flow from units 12 and 55 is balanced. The resistance to flow of tubes 43, 44 is also balanced by making them of the same length and bore.

In operating the apparatus, the carriage is adjusted so that the distance from its surface 34 to the orifice of the unit 55 equals the difference between the distance from the face of roller 10 to the orifice of unit 12 and the desired thickness of plastic material 11. Fluid under pressure, preferably dry air, is admitted to line 41 and escapes through the orifices of the units 12 and 55. The calender or other machine forming the plastic sheet may then be adjusted until the manometer tube 48 indicates balanced pressures in tubes 46, 47. Any variation in thickness of the material will cause the fluid to rise or fall in the manometer tube 48 and indicate such variation to the operator. Variations in line pressure of line 41 will not change the manometer reading as the increase or decrease in pressure will be simultaneous in both limbs of the manometer tube.

When it is desired to calender material to different thicknesses within the range permitted by the spacing of the calender roll and the gauge unit, it is unnecessary to change the adjustment of the gauge unit 12 with relation to the surface of the roll. Sensitivity of the instrument increases directly with increase in air pressure and when measuring extremely thin materials or for extremely accurate measurements, the air pressure may be increased by regulation of valve 42 to obtain great sensitivity.

Variations may be made without departing from the scope of the invention as it is defined by the following claims.

We claim:

1. Measuring apparatus comprising a chamber having an orifice, means for supporting the chamber from the surface of a rotating member at a fixed distance therefrom, a second chamber having second orifice spaced from an adjustable surface, said adjustable surface having substantially the conformation of the surface of said rotating member, means for supplying fluid under balanced pressure to both chambers, and means connected between said chambers for indicating difference in pressure in the chambers due to difference in flow of fluid from said orifices.

2. Measuring apparatus comprising a chamber having an orifice adapted to face an object to be measured in spaced relation therefrom, a rotating surface for supporting the object to be measured, means providing a three-point support for said chamber from said surface, a second chamber having an orifice and a second surface spaced from the orifice, said second surface having substantially the conformation of the rotating surface, means for supplying fluid under pressure to both chambers for flow through said orifices, and means for connecting said chambers for indicating difference in pressures in the two chambers.

3. Measuring apparatus comprising a chamber having an orifice adapted to face an object to be measured in spaced relation therefrom, a surface for supporting the object to be measured, temperature compensated means for supporting said chamber from said surface, a second chamber having an orifice and a surface spaced from the orifice, means for supplying fluid under pressure to both chambers for flow through said orifices, and means for connecting said chambers for indicating difference in pressures in the two chambers.

4. Measuring apparatus comprising a chamber having an orifice adapted to face material to be measured in spaced relation therefrom, a movable surface for supporting the material to be measured, a plurality of knives arranged to contact with said surface to provide a three-point support for said chamber from said surface, temperature compensating means located between said knives and said chamber, a second chamber having an orifice and a surface spaced from the orifice, means for adjusting said last-named orifice with relation to its surface, means for supplying fluid under balanced pressure to both chambers from a single source for flow through said orifices, and means for indicating difference in pressures in the two chambers.

JOHN M. DAVIES.
HARVEY A. SCHULTZ.